(12) United States Patent  
    Gonzalez

(10) Patent No.:  US 12,594,570 B1  
(45) Date of Patent:  Apr. 7, 2026

(54) SYSTEM AND DEVICE FOR TEMPORARILY JOINING DOORS

(71) Applicant: Ricardo Valente Gonzalez, Peoria, IL (US)

(72) Inventor: Ricardo Valente Gonzalez, Peoria, IL (US)

( * ) Notice: Subject to any disclaimer, the term of this patent is extended or adjusted under 35 U.S.C. 154(b) by 0 days.

(21) Appl. No.: 18/786,801

(22) Filed: Jul. 29, 2024

Related U.S. Application Data

(60) Provisional application No. 63/529,511, filed on Jul. 28, 2023.

(51) Int. Cl.  
    *B05B 13/02*      (2006.01)  
    *F16M 13/00*      (2006.01)  
    *F16M 13/02*      (2006.01)  
    *F16N 13/02*      (2006.01)

(52) U.S. Cl.  
    CPC ......... *B05B 13/0285* (2013.01); *F16M 13/00* (2013.01); *F16N 13/02* (2013.01); *B05B 13/0292* (2013.01)

(58) Field of Classification Search  
    CPC ...................... B05B 13/0285; B05B 13/0292; F16M 13/00; F16M 13/02; E04C 2003/026  
    USPC ................. 52/127.2; 269/904, 905; 248/351  
    See application file for complete search history.

(56) References Cited

U.S. PATENT DOCUMENTS

| | | | | |
|---|---|---|---|---|
| 1,715,722 A | * | 6/1929 | Smith ...................... B25B 5/00 248/166 |
| 3,027,686 A | * | 4/1962 | Oates ................. E04F 21/0015 52/127.2 |

| | | | | |
|---|---|---|---|---|
| 3,574,981 A | * | 4/1971 | Henschen ............... E04G 21/26 248/354.3 |
| 3,718,307 A | * | 2/1973 | Albanese ............... H02G 3/386 248/57 |
| 3,851,868 A | * | 12/1974 | Lagasse ............. E04F 21/0015 269/208 |
| 4,083,156 A | * | 4/1978 | Tye ......................... E04G 21/26 403/379.5 |

(Continued)

FOREIGN PATENT DOCUMENTS

| | | | | |
|---|---|---|---|---|
| EP | 2251095 B1 | 11/2010 | | |
| GB | 2557919 A | * | 7/2018 | .......... E04F 21/0023 |

OTHER PUBLICATIONS

FoamPRO 132 spray painting door stand. Amazon.com. (Dec. 19, 2012). https://a.co/d/4hrktCr (Year: 2012).*

*Primary Examiner* — Taylor Morris  
(74) *Attorney, Agent, or Firm* — John Rizvi; John Rizvi, P.A.—The Patent Professor®

(57)                ABSTRACT

A system and device for temporarily joining doors together to support one another on a support surface. The device includes a first door holder having a first connector attached to a first shaft and a first mounting plate to removably affix the first door holder to one of the doors, and a second door holder having a second connector attached to a second shaft and a second mounting plate to removably affix the second door holder to a different one of the doors. The first and second door holders releasably engagable with one another to temporarily join the doors together such that the doors cooperatively support one another on the support surface while the first and second door holders are releasably engaged with one other. The system includes the device and one or more door supports to facilitate supporting the doors in an upright position on the support surface.

6 Claims, 11 Drawing Sheets

(56) References Cited

U.S. PATENT DOCUMENTS

| | | | | |
|---|---|---|---|---|
| 4,281,487 | A * | 8/1981 | Koller | F16F 7/125 |
| | | | | 52/741.1 |
| 4,850,115 | A * | 7/1989 | Price | H02G 3/125 |
| | | | | D10/64 |
| 4,918,799 | A * | 4/1990 | Benedetti | B27D 1/083 |
| | | | | 144/345 |
| 5,164,011 | A * | 11/1992 | Ray | B05B 13/0285 |
| | | | | 118/503 |
| 5,253,839 | A * | 10/1993 | McClure | E04G 21/1858 |
| | | | | 52/127.2 |
| 5,660,637 | A * | 8/1997 | Dodge | B05B 13/0285 |
| | | | | 211/208 |
| 5,833,181 | A * | 11/1998 | DesNoyers | G09F 7/22 |
| | | | | 248/156 |
| 5,846,016 | A * | 12/1998 | Martinez | B05B 13/02 |
| | | | | 403/384 |
| 5,904,225 | A * | 5/1999 | Patros | B25H 1/08 |
| | | | | 182/183.1 |
| 5,934,631 | A * | 8/1999 | Becker | H02G 3/125 |
| | | | | 248/200.1 |
| 6,068,084 | A * | 5/2000 | Taormina | E04G 21/3219 |
| | | | | 248/200.1 |
| 6,123,173 | A * | 9/2000 | Patros | B25H 1/06 |
| | | | | 182/183.1 |
| 6,266,849 | B1 | 7/2001 | Petit et al. | |
| 6,505,803 | B1 * | 1/2003 | Hernandez | A47B 51/00 |
| | | | | 248/354.3 |
| 6,519,791 | B2 * | 2/2003 | Randolph | E03C 1/021 |
| | | | | 4/695 |
| 6,702,130 | B1 * | 3/2004 | Carlilse | B05B 13/0285 |
| | | | | 269/53 |
| 7,040,586 | B2 * | 5/2006 | Kusber | H02G 3/30 |
| | | | | 248/200.1 |
| 7,299,590 | B1 * | 11/2007 | Gibbs | E04F 21/0015 |
| | | | | 248/354.3 |
| 7,481,323 | B2 * | 1/2009 | Fisher | B05B 13/0285 |
| | | | | 211/196 |
| 7,665,252 | B2 * | 2/2010 | Lang | E04G 21/26 |
| | | | | 52/127.2 |
| 7,726,003 | B1 * | 6/2010 | Rocha | B05B 13/0285 |
| | | | | 29/559 |
| 7,798,095 | B2 | 9/2010 | Navarro | |
| 7,967,157 | B2 * | 6/2011 | Bilotto | A47F 5/12 |
| | | | | 211/182 |
| 8,066,267 | B2 | 11/2011 | Schaerer | |
| 8,177,207 | B2 | 5/2012 | Waters | |
| 8,398,062 | B1 | 3/2013 | Condit | |
| 8,419,000 | B2 * | 4/2013 | St. John | B25B 11/00 |
| | | | | 269/1 |
| 8,707,976 | B2 | 4/2014 | Bauer | |
| D735,555 | S * | 8/2015 | Tajdus | D8/354 |
| 10,202,241 | B2 * | 2/2019 | Valliere | B65G 1/14 |
| 10,458,163 | B1 * | 10/2019 | Trump | B05B 13/0285 |
| 10,626,905 | B1 * | 4/2020 | Chiu | A47B 57/545 |
| 2004/0222179 | A1 * | 11/2004 | Garcia | B25H 1/00 |
| | | | | 211/175 |
| 2005/0126658 | A1 * | 6/2005 | Goodwin | B05B 13/0285 |
| | | | | 144/286.5 |
| 2005/0230578 | A1 * | 10/2005 | Stockton | B05B 13/02 |
| | | | | 248/300 |
| 2007/0012847 | A1 * | 1/2007 | Tai | E04B 9/006 |
| | | | | 248/200.1 |
| 2007/0175390 | A1 * | 8/2007 | Allen, II | B05B 13/0292 |
| | | | | 118/505 |
| 2007/0278363 | A1 | 12/2007 | Klippel | |
| 2009/0256039 | A1 * | 10/2009 | Allen, III | B05B 13/0292 |
| | | | | 248/222.14 |
| 2015/0026959 | A1 | 1/2015 | Dumas et al. | |
| 2016/0023229 | A1 * | 1/2016 | Johnson | B25H 1/0007 |
| | | | | 269/152 |
| 2018/0281013 | A1 * | 10/2018 | Tresse | B05B 16/90 |
| 2020/0108488 | A1 * | 4/2020 | St. John | B05B 13/0285 |
| 2020/0140054 | A1 * | 5/2020 | Osborne | B29C 66/02245 |

* cited by examiner

SYSTEM AND DEVICE FOR TEMPORARILY JOINING DOORS

CROSS-REFERENCE TO RELATED APPLICATION(S)

This non-provisional patent application is based on and claims priority to Provisional Patent Application 63/529,511, filed Jul. 28, 2023, the entire contents of which are incorporated herein by reference.

FIELD OF THE INVENTION

The invention relates generally to door supports, and more particularly, to a system and device for temporarily joining a pair of doors together to facilitate painting.

BACKGROUND OF THE INVENTION

During construction or reconstruction of homes, offices, stores, etc. it is often necessary to paint doors. The doors may be old requiring a new coat of paint or may be new and provided raw or with a coat of primer paint. Typically, the customer specifies a particular color to be painted on the doors.

Painting doors indoor causes several problems. The paint may overspray onto unwanted surfaces and the space available to position the doors for painting may be limited. Quite often, the doors are moved outside to paint them. It is more efficient to paint a couple of doors at a time rather than singly.

In order to completely paint all surfaces of the doors, the doors need to be held upright off of a floor or other support surface. This is typically accomplished by having one or more helpers hold the doors upright relative to the support surface for the painter. This is an inefficient method of painting several doors at a time in terms of time and money.

Accordingly, there is need for a solution to at least one of the aforementioned problems. For instance, there is an established need for device to hold doors in upright positions to be painted without the assistance of helpers.

SUMMARY OF THE INVENTION

In a first implementation of the invention, a device for temporarily joining doors together to cooperatively support one another on a support surface includes a first door holder having a first connector attached to a first shaft, and at least one first mounting plate attached to the first shaft to removably affix the first door holder to one of the doors. A second door holder having a second connector attached to a second shaft, and at least one second mounting plate attached to the second shaft to removably affix the second door holder to a different one of the doors. The first door holder is releasably engagable with the second door holder to temporarily join the doors together, the doors cooperatively supporting one another on the support surface while the first door holder is removably affixed to the one of the doors and the second door holder is removably affixed to the different one of the doors, and the first door holder is releasably engaged with the second door holder.

In a second aspect, the first connector is a male connector and the second connector is a female connector configured and dimensioned to releasably receive the first connector therein.

In another aspect, the at least one first mounting plate is attached to the first shaft at a first angle.

In one further aspect, the first angle is from about 30 degrees to about 60 degrees.

In still another aspect, the at least one second mounting plate is attached to the second shaft at a second angle.

In yet one further aspect, the second angle is from about 30 degrees to about 60 degrees.

In another aspect, the first angle is approximately equal to the second angle.

In one further aspect, the first shaft has a generally open trapezoidal cross-sectional configuration.

In still another aspect, the first connector has a generally open trapezoidal cross-sectional configuration.

In yet one further aspect, the second shaft has a generally open trapezoidal cross-sectional configuration.

In another aspect, the second connector has a generally closed trapezoidal cross-sectional configuration at least partially defining a closed channel therein.

In a second implementation of the invention, a device for temporarily joining doors together to cooperatively support one another on a support surface includes a first door holder having a first connector attached to a first shaft, and a first mounting plate attached to the first shaft at a first angle to removably affix the first door holder to one of the doors. A second door holder has a second connector attached to a second shaft, and a second mounting plate attached to the second shaft at a second angle to removably affix the second door holder to a different one of the doors. The first connector is a male connector and the second connector is a female connector configured and dimensioned to releasably receive the first connector therein. The first door holder is releasably engagable with the second door holder to temporarily join the doors together, the doors cooperatively supporting one another on the support surface while the first door holder is removably affixed to the one of the doors and the second door holder is removably affixed to the different one of the doors, and the first door holder is releasably engaged with the second door holder.

In a third implementation of the invention, a system for temporarily joining doors together to cooperatively support one another on a support surface includes a device for temporarily joining doors together, the device including a first door holder having a first connector attached to a first shaft, and at least one first mounting plate attached to the first shaft to removably affix the first door holder to one of the doors. A second door holder has a second connector attached to a second shaft, and at least one second mounting plate attached to the second shaft to removably affix the second door holder to a different one of the doors. The first door holder is releasably engagable with the second door holder to temporarily join the doors together, the doors cooperatively supporting one another on the support surface while the first door holder is removably affixed to the one of the doors and the second door holder is removably affixed to the different one of the doors, and the first door holder is releasably engaged with the second door holder. The system further includes one or more door supports to facilitate supporting the doors in an upright position on the support surface.

These and other objects, features, and advantages of the invention will become more readily apparent from the attached drawings and the detailed description of the embodiments, which follow.

BRIEF DESCRIPTION OF THE DRAWINGS

The embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the invention is directed toward a device and a system for temporarily joining doors together to support the doors in an upright position for ease of painting by a single person.

Figure 1:
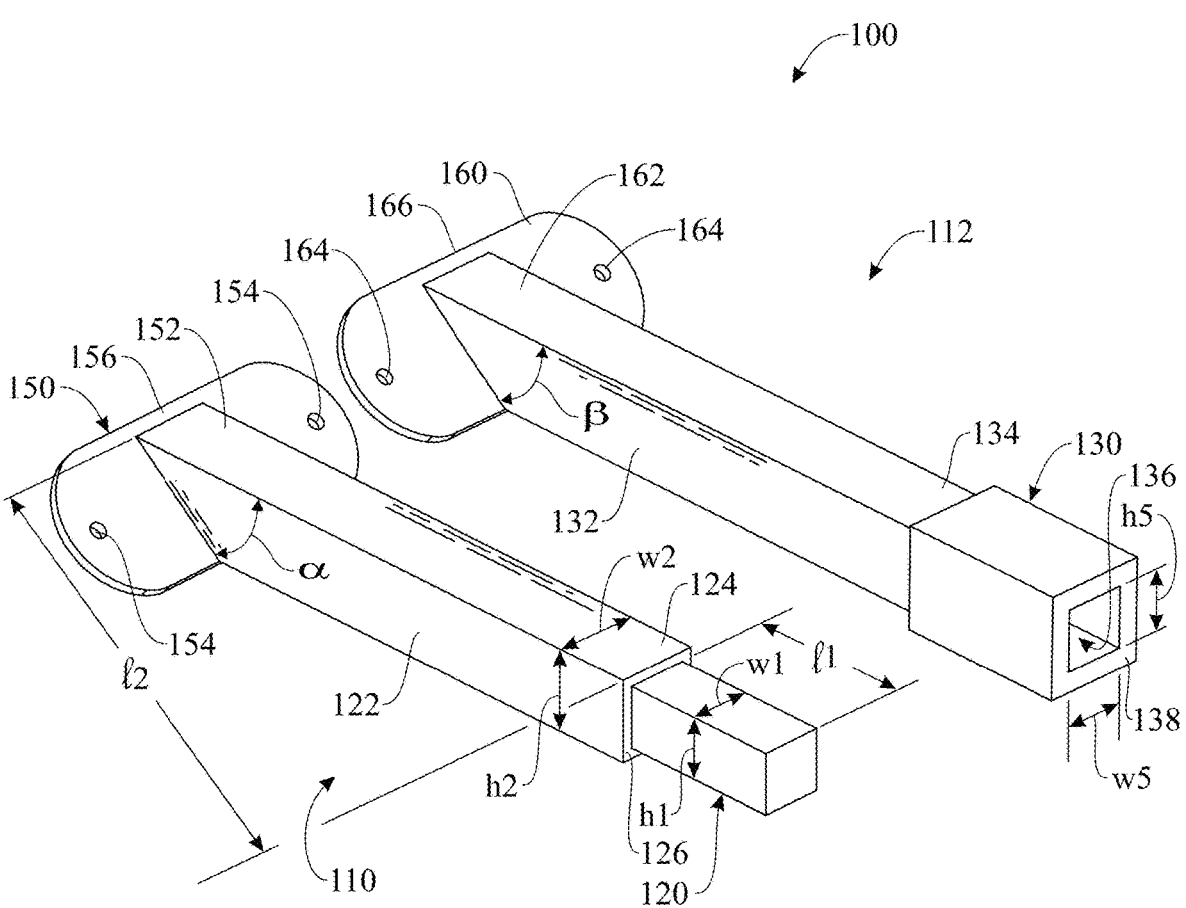
FIG. 1 presents a top, side isometric view, with parts separated, of a device for temporarily joining doors together to facilitate painting, including first and second door holders, in accordance with one exemplary illustrative embodiment of the invention.
Figure 2:
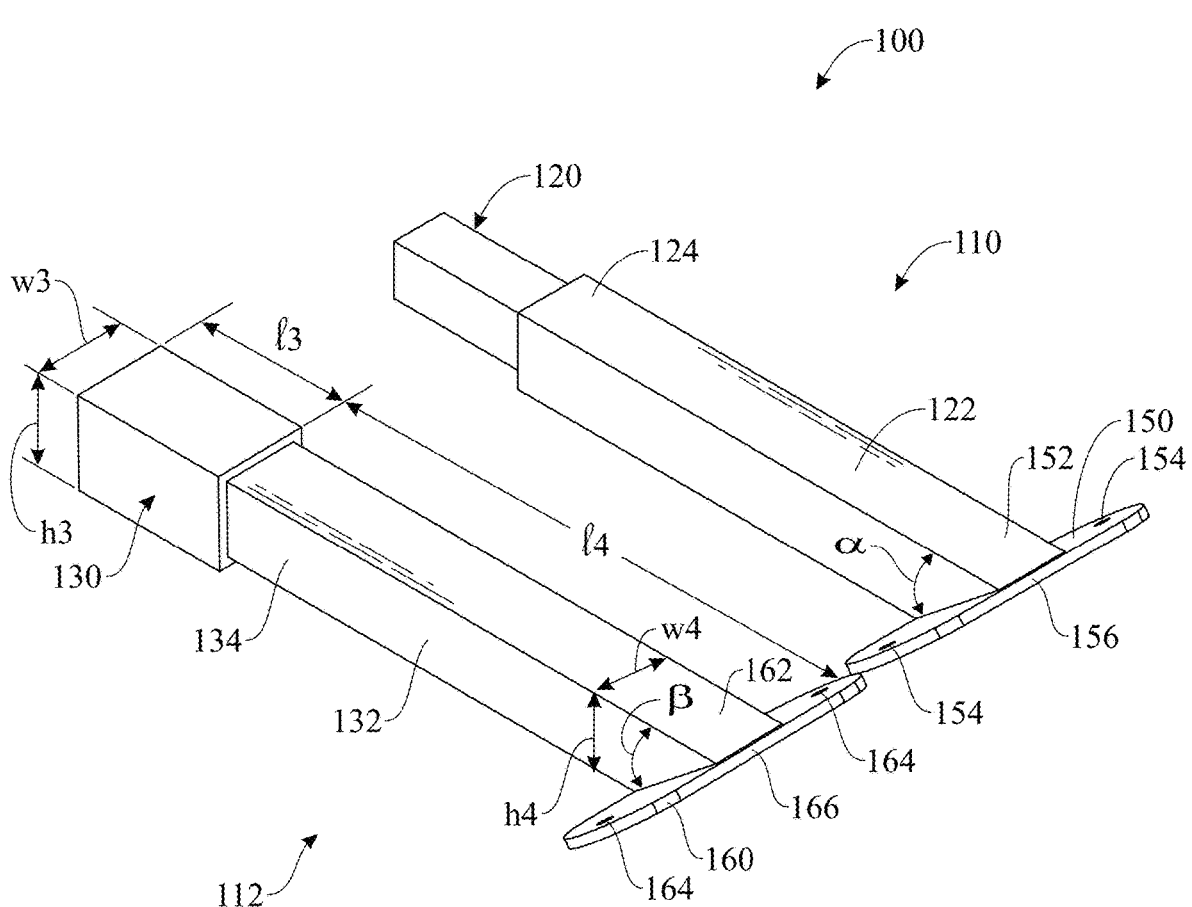
FIG. 2 presents a top, opposite side view, with parts separated, of the first and second door holders of the device for temporarily joining doors together illustrated in FIG. 1.

Referring initially to FIGS. 1 and 2, a device for temporarily joining doors together to cooperatively support one another on a support surface, hereinafter device for temporarily joining doors 100, is illustrated in accordance with one exemplary embodiment of the invention. As shown, the device for temporarily joining doors 100 includes a first door holder 110 for temporary affixation to a first door and a second door holder 112 for temporary affixation to a second door and for releasable engagement with the first door holder 110. The first and second door holders 110, 112, respectively, as shown in FIGS. 1 and 2 temporarily join a pair of doors (not shown) together to allow the doors to be supported in an upright position on a support surface for ease of painting by a single person.

The first door holder 110 generally includes a first or male connector 120 attached to a first shaft 122. The male connector 120 extends from a first end 124 of the first shaft 112. One or both of the male connector 120 or the first shaft 122 may have a rectangular cross-sectional configuration. It will be appreciated by a person of ordinary skill in the art that it is within the scope and intent of the invention for the male connector 120 and/or the first shaft 122 to have any of a number of cross-sectional configurations including by way of example, but in no manner limited too, circular, oval, star-shaped, triangular, pentagonal, hexagonal, or octagonal. As shown in the illustrative embodiment of FIGS. 1 and 2, the male connector 120 and the first shaft 122 have square cross-sectional configurations, wherein the male connector 120 has a first width w1 which is approximately equal to a first height h1, and a first length l1 which may be about 2 to 3 times the first width w1. In addition, the first shaft 112 has a second width w2 which is approximately equal to a second height h2, and a second length l2 which may be about 4 to 6 times the second width w2. As shown in FIG. 1, the first width w1 and the first height h1 of the male connector 120 are less than the second width w2 and the second height h2 of the first shaft 122. Thus, the male connector 120 extends from an end face 126 at the first end 124 of the first shaft 122.

Similarly, the second door holder 112 includes a second or female connector 130 extending from a second shaft 132. The female connector 130 and the second shaft 132 may also have a rectangular cross-sectional configuration. The female connector 130 extends from a first end 134 of the second shaft 132. Similar to the male connector 120 and the first shaft 122, it will be appreciated by a person of ordinary skill in the art that it is within the scope and intent of the invention for the female connector 130 and/or the second shaft 132 to have any of a number of cross-sectional configurations including by way of example, but in no manner limited too, circular, oval, star-shaped, triangular, pentagonal, hexagonal, or octagonal. In one embodiment the female connector 130 has a square cross-sectional configuration with a third width w3 approximately equal to a third height h3, and a third length l3 which may be about 2 to 3 times the third width w3. The second shaft 132 may also have a square cross-sectional configuration with a fourth width w4 which is approximately equal to a fourth height h4, and a fourth length l4 which may be about 4 to 6 times the fourth width w4. As shown in FIG. 2, the third width w3 and the third height h3 of the female connector 130 are greater than the fourth height h4 and the fourth width w4 of the second shaft 132, respectively.

In order to releasably engage the first door holder 110 with the second door holder 112, the male connector 120 of the first door holder 110 is insertable into a channel 136 defined in the female connector 130 of the second door holder 110. The channel 136 may have a generally rectangular cross-sectional configuration and, in one embodiment, the channel 136 has a square cross-sectional configuration with a fifth width w5 approximately equal to a fifth height h5. The fifth width w5 and the fifth height h5 of the channel 136 defined in the female connector 130 of the second door holder 112 are slightly greater than the first width w1 and the first height h1 of the male connector 120 of the first door holder 110, to allow the male connector 120 of the first door holder 110 to be inserted into the female connector 130 of the second door holder 112, and to releasably engage the first and second door holders 110, 112, respectively, with one another. By way of example only, in one embodiment, the first width w1 and the first height h1 of the male connector 120 may be from about 0.75 inches to about 1.25 inches, while the fifth width w5 and the fifth height h5 of the channel 136 may be from about 1.0 inch to about 1.5 inches.

While not specifically shown, the depth of the channel 136 in the female connector 130 of the second door holder 112 is slightly greater than the first length l1 of the male connector 110. This allows the male connector 110 to be completely inserted into the female connector 130 such that an end face 138 of the female connector 130 of the second door holder 112 abuts the end face 126 of the first shaft 122 of the first door holder 110 when the first and second door holders 110, 112, respectively, are fully and releasably engaged with one another.

A releasable connector (not shown) in the form of a removable pin or other removable fastener may be provided to temporarily secure the male connector 120 of the first door holder 110 within the channel 136 in the female connector 130 of the second door holder 112. In this case, the first and second door holders 110, 112, respectively, would include apertures to accommodate the releasable connector.

In order to secure the first door holder 110 to a first door, discussed herein below, the first door holder 110 includes a first mounting bracket or plate 150 extending from a second end 152 of the first shaft 122. The mounting plate 150 may have a generally oval shape and includes mounting apertures 154 for receipt of fasteners to secure the first door holder 110 to an edge of door as discussed in more detail herein below.

The second end 152 of the first shaft 122 of the first door holder 110 may be secured to the first mounting plate 150 proximate a middle portion 156 of the first mounting plate

150. The mounting apertures 154 may be located through the mounting plate 150 on either side of the first shaft 122 and the middle portion 156 of the mounting plate 150. As shown, the mounting plate 150 is oriented at a first angle α relative to the first shaft 122. Thus, the second end 152 of the first shaft 122 terminates at the first angle α. The first angle α may be from about 20 degrees to about 70 degrees, or from about 30 degrees to about 60 degrees (e.g., about 45 degrees). By orienting the first mounting plate 150 of the first door holder 110 at an angle relative to the first shaft 122 of the first door holder 110, a door attached to the first door holder 110 is supported at an angle relative to a support surface for case of painting. This also places the first door holder 110 in position to cooperatively support a second door attached to the second door holder 112 when the first and second door holders 110, 112, respectively, are releasably engaged with one another, as discussed in more detail herein below.

In a similar manner, the second door holder 112 has a second mounting bracket or plate 160 extending from a second end 162 of the second shaft 132 of the second door holder 112. The second mounting plate 160 has mounting apertures 162 for securing the second mounting plate 160, and thus the second door holder 112, to a second door. The second end 162 of the second shaft 132 may be secured proximate a middle portion 166 of the second mounting plate 160 and on either side of the second shaft 132. Similar to the first door holder 110, the second mounting plate 160 is oriented at a second angle β relative to the second shaft 132. The second end 162 of the second shaft 132 terminates at the second angle β which may be the same or different from the first angle α formed on the second end 152 of the first shaft 122 of the first door holder 110. The second angle β may be from about 20 degrees to about 70 degrees, or from about 30 degrees to about 60 degrees (e.g., about 45 degrees). As with the first door holder 110 above, this allows the second door holder 112 to cooperatively support a second door attached to the second door holder 112 at an angle relative to the support surface for ease of painting.

The first and second door holders 110, 112, respectively, of the device for temporarily joining doors 100 may be formed from a variety of materials such as, for example, metallic materials, wood, fiberglass or polymeric materials. Metallic materials may include, but are in no manner limited to, brass, bronze, steel, stainless steel, or aluminum. Polymeric materials may include, but again are in no manner limited to, plastics, such as polyvinyl chloride, thermoplastics, or hard rubber. In one embodiment, the first and second door holders 110, 112, respectively, are formed from stainless steel.

The components of the first door holder 110, including the male connector 120, the first shaft 122 and the first mounting plate 150, may be connected to each other in various manners such as, by way of example only, welding, soldering, adhesives, or mechanical fasteners. In one embodiment, the male connector 120 is formed integrally with the first shaft 122 and the first mounting plate 150 is welded to the second end 152 of the first shaft 122.

Similarly, the components of the second door holder 112, including the female connector 130, the second shaft 132 and the second mounting plate 160, may also be connected to each other in various manners such as, by way of example only, welding, soldering, adhesives, or mechanical fasteners. In one embodiment, the female connector 130 is formed integrally with the second shaft 132 and the second mounting plate 160 is welded to the second end 162 of the second shaft 132.

Figure 1A:
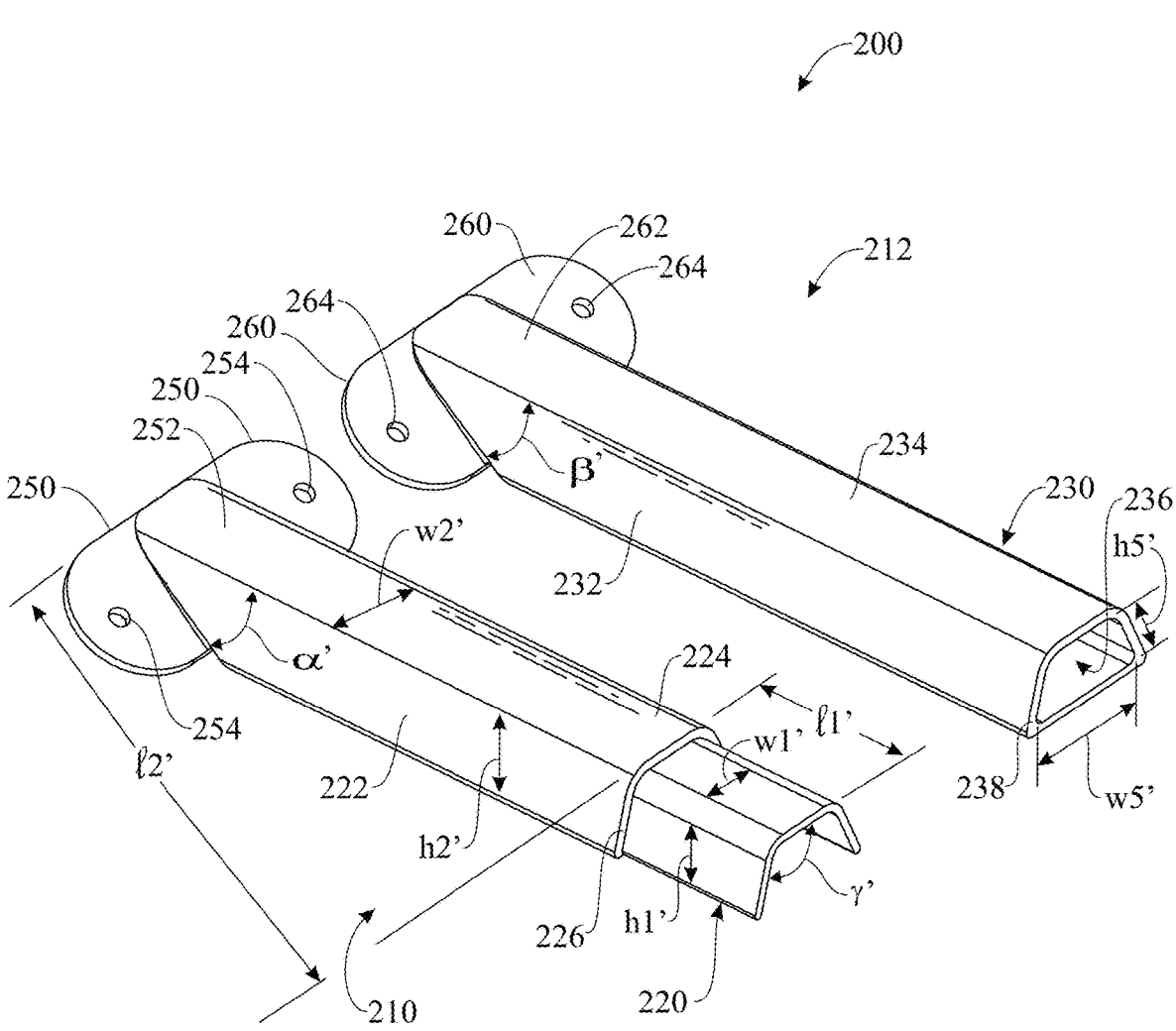
FIG. 1A presents a top, side isometric view, with parts separated, of a device for temporarily joining doors together to facilitate painting, including first and second door holders, in accordance with another exemplary illustrative embodiment of the invention.
Figure 2A:
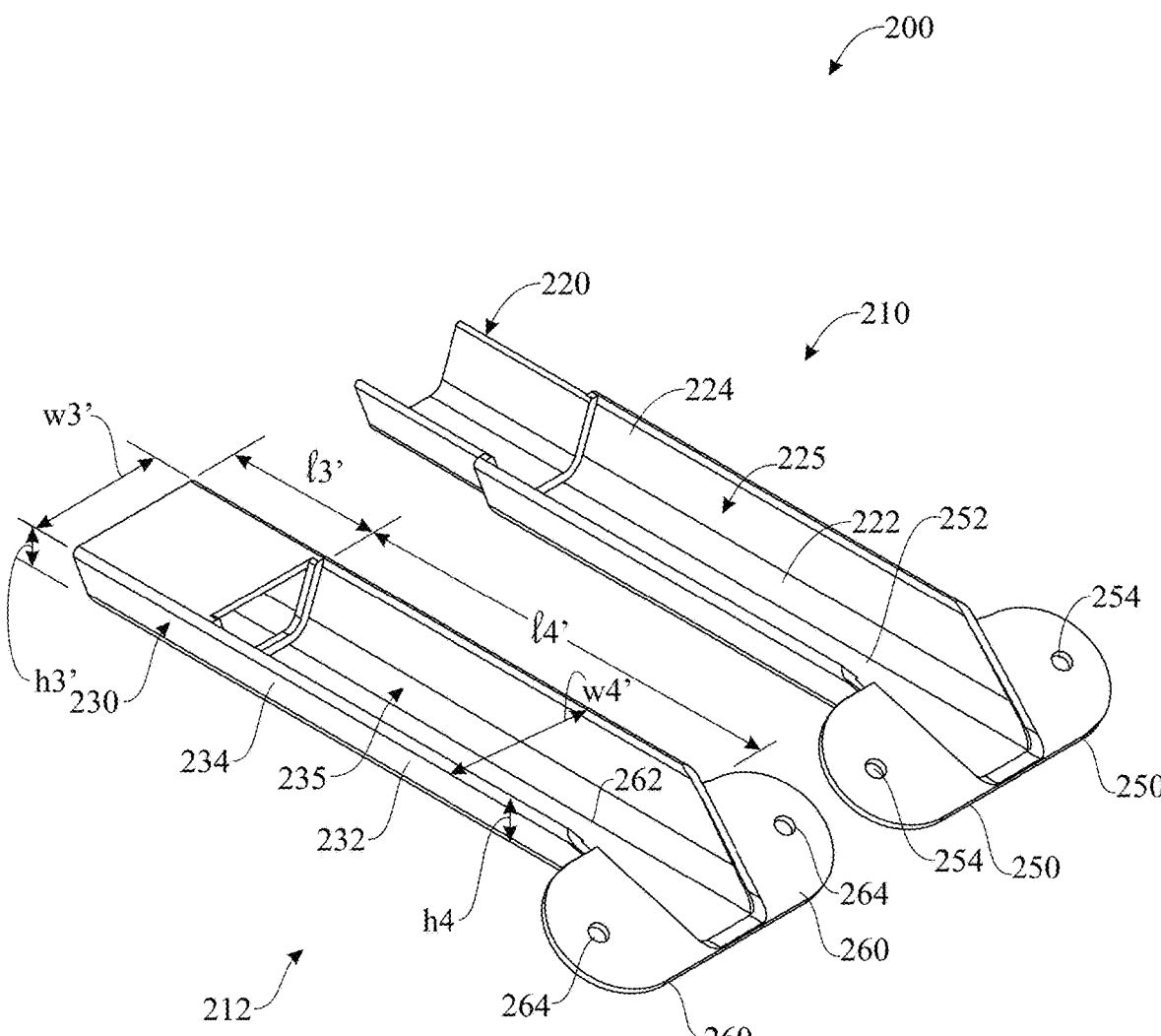
FIG. 2A presents a bottom, opposite side view, with parts separated, of the first and second door holders of the device for temporarily joining doors together illustrated in FIG. 1A.

FIGS. 1A and 2A are illustrative of a device for temporarily joining a pair of doors together to cooperatively support one another on a support surface, hereinafter, the device for temporarily joining doors 200, in accordance with another exemplary embodiment of the invention. As shown in FIGS. 1A and 2A, and similar to the illustrative embodiment of FIGS. 1 and 2, the device for temporarily joining doors 200 includes a first door holder 210 for temporary affixation to a first door and a second door holder 212 for temporary affixation to a second door and releasable engagement with the first door holder 210. The first and second door holders 210, 212, respectively, are provided to temporarily join a pair of doors together to allow the doors (not shown) to be supported in an upright position on a support surface for case of painting by a single person.

The first door holder 210 generally includes a first or male connector 220 attached to a first shaft 222. The male connector 220 extends from a first end 224 of the first shaft 212. The male connector 220 and the first shaft 222 may have trapezoidal cross-sectional configurations. More particularly, the male connector 220 and the first shaft 222 each have a generally open trapezoidal cross-sectional configuration formed of an upper portion and oppositely disposed sidewalls extending therefrom at a third angle γ forming an open channel 225 there between, as shown in the illustrative embodiment of FIGS. 1A and 2A. The male connector 220 has a first width w1' which may be about equal to a first height h1', and a first length l1' which may be about 2 to 3 times the first width w1'. The first shaft 212 has a width second w2' which may be about equal to a second height h2', and a second length l2' which may be about 4 to 6 times the second width w2'. As shown in FIG. 1A, the first width w1' and the first height h1' of the male connector 220 are less than the second width w2' and the second height h2' of the first shaft 222. Thus, the male connector 220 extends from an end face 226 at the first end 224 of the first shaft 222.

The second door holder 212 includes a second or female connector 230 attached to and extending from a second shaft 232. The female connector 230 and the second shaft 232 may also have trapezoidal cross-sectional configurations. More particularly, the female connector 230 has a generally closed trapezoidal cross-sectional configuration formed of an upper portion and oppositely disposed sidewalls extending therefrom at the third angle γ' to a lower portion, thereby forming a closed channel 236 there between, as shown in FIGS. 1A and 2A. In some embodiments, the second shaft 232 has a generally open trapezoidal cross-sectional configuration formed of an upper portion and oppositely disposed sidewalls extending therefrom at the third angle γ' forming an open channel 235 there between, as also shown in FIGS. 1A and 2A. In one embodiment the female connector 230 has a third width w3' which may be about equal to a third height h3', and a third length l3' which may be about 2 to 3 times the third width w3'. The second shaft 232 may also be trapezoidal in cross-section having a fourth width w4' which maybe about equal to a fourth height h4', and a fourth length l4' which may be about 4 to 6 times the fourth width w4'. As shown in FIG. 2A the third width w3' and the third height h3' of the female connector 230 are greater than the fourth height h4' and the fourth width w4' of the second shaft 232.

In order to connect the first door holder 210, to the second door holder 212, the male connector 220 of the first door holder 110 is insertable into the closed channel 236 defined in the female connector 230 of the second door holder 210. The closed channel 236 has a generally trapezoidal cross-sectional configuration and, in one embodiment, has a fifth width w5' and a fifth height h5', wherein the fifth width w5' and the fifth height h5' of the channel 236 defined in the female connector 230 of the second door holder 212 are slightly larger than the first width w1' and the first height h1' of the male connector 220 of the first door holder 210, to allow the male connector 220 of the first door holder 210 to be inserted into the female connector 230 of the second door holder 212, and to releasably engage the first and second door holders 210, 212, respectively, with one another. By way of example only, in one embodiment, the first width w1' and the first height h1' of the male connector 220 may be from about 0.75 inches to about 1.25 inches, while the fifth width w5' and the fifth height h5' of the channel 236 may be from about 1.0 inch to about 1.5 inches.

While not specifically shown, the depth of the closed channel 236 in the female connector 230 of the second door holder 212 is slightly greater than the first length l1' of the male connector 210. This allows the male connector 210 to be completely inserted into the female connector 230 such that an end face 238 of the female connector 230 of the second door holder 212 abuts the end face 226 of the first shaft 222 of the first door holder 210 when the first and second door holders 210, 212, respectively, are fully and releasably engaged with one another.

A releasable connector (not shown) in the form of a removable pin or other removable fastener may be provided to temporarily secure the male connector 220 of the first door holder 210 within the closed channel 236 in the female connector 230 of the second door holder 212. In this case, the first and second door holders 210, 212, respectively, include apertures to accommodate the releasable connector.

In order to secure the first door holder 210 to a first door, discussed herein below, the first door holder 210 includes first mounting brackets or plates 250 extending from opposite sides of a second end 252 of the first shaft 222. The mounting plates 250 may have generally rounded configurations and include mounting apertures 254 for receipt of fasteners to secure the first door holder 210 to a door as discussed in more detail herein below. The mounting apertures 254 may be formed through the mounting plates 250 on either side of the first shaft 222. As shown, the mounting plates 250 are oriented at a first angle α' relative to the first shaft 222. Thus, the second end 252 of the first shaft 222 terminates at the first angle α'. The first angle α' may be from about 20 degrees to about 70 degrees, or from about 30 degrees to about 60 degrees (e.g., about 45 degrees). By orienting the first mounting plates 250 of the first door holder 210 at an angle relative to the first shaft 222 of the first door holder 210, a door attached to the first door holder 210 is supported at an angle relative to the support surface for ease of painting. This also places the first door holder 210 in position to cooperatively support a second door attached to the second door holder 212 when the first and second door holders 210, 212, respectively, are releasably engaged with one another, as discussed in more detail herein below.

Likewise, the second door holder 212 also has second mounting brackets or plates 260 extending from opposite sides of a second end 262 of the second shaft 232 of the second door holder 212. The second mounting plates 260 also have mounting apertures 262 for securing the second mounting plates 260, and thus the second door holder 212, to a second door. Similar to the first door holder 210, the second mounting plates 260 are oriented at a second angle β' relative to the second shaft 232. The second end 262 of the second shaft 232 terminates at a second angle β' which may be the same or different from the first angle α' formed on the second end 252 of the first shaft 222 of the first door holder 210. The second angle β' may be from about 20 degrees to about 70 degrees, or from about 30 degrees to about 60 degrees (e.g., about 45 degrees). As with the first door holder 210 above, this allows the second door holder 212 to cooperatively support a second door attached to the second door holder 212 at an angle relative to the support surface for ease of painting.

The first and second door holders 210, 212, respectively, of the device for temporarily joining doors 200 may be formed from a variety of materials such as, for example, metallic materials, wood, fiberglass or polymeric materials. Metallic materials may include, but are in no manner limited to, brass, bronze, steel, stainless steel, or aluminum. Polymeric materials may include, but again are in no manner limited to, plastics, such as polyvinyl chloride, thermoplastics, or hard rubber. In one embodiment, the first and second door holders 210, 212, respectively, are formed from stainless steel.

The components of the first door holder 210, including the male connector 220, the first shaft 222 and the first mounting plates 250, may be connected to each other in various manners such as, by way of example only, welding, soldering, adhesives, or mechanical fasteners. In one embodiment, the male connector 220 is formed integrally with the first shaft 222 and the first mounting plates 250 are welded onto the opposite sides or second end 252 of the first shaft 222.

Similarly, the components of the second door holder 212, including the female connector 230, the second shaft 232 and the second mounting plates 260, may also be connected to each other in various manners such as, by way of example only, welding, soldering, adhesives, or mechanical fasteners. In one embodiment, the female connector 230 is formed integrally with the second shaft 232 and the second mounting plates 260 are welded onto the opposite sides of the second end 262 of the second shaft 232.

Turning now to FIGS. 3 through 6, the use of the device for temporarily joining doors 100, as shown in the illustrative embodiment of FIGS. 1 and 2, to support a pair of doors together in an upright position and at an angle relative to each other for ease of painting will now be described. The use of the device for temporarily joining doors 200, as shown in the illustrative embodiment of FIGS. 1A and 2A, proceeds in substantially similar manner as described herein below.

Figure 3:
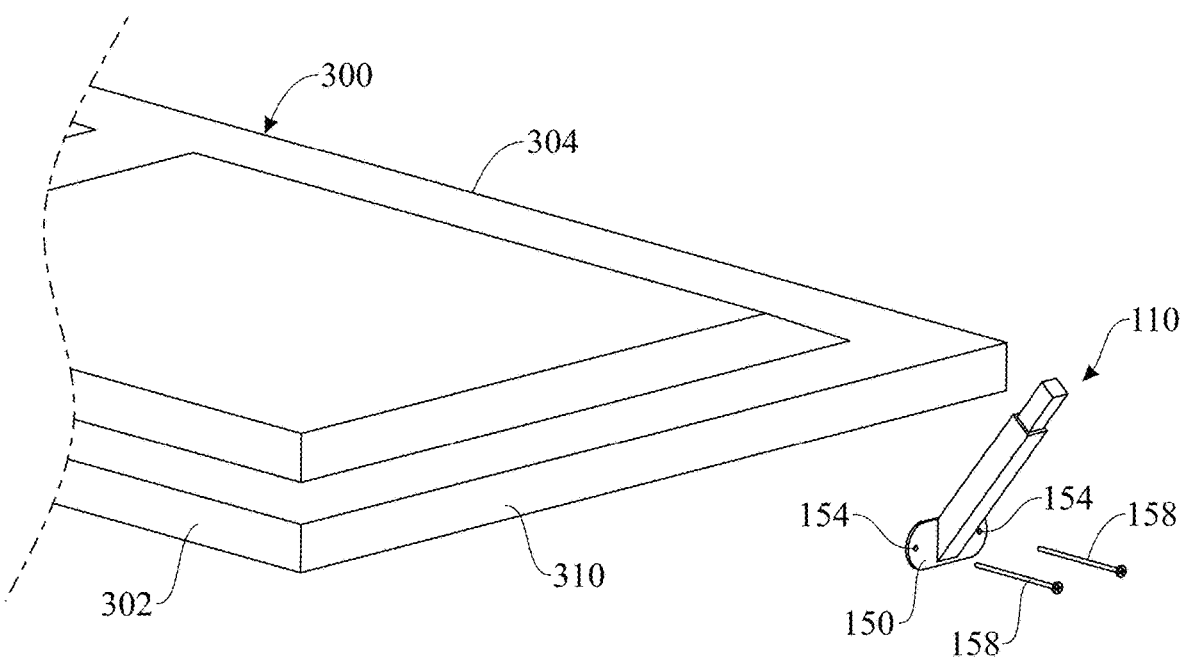
FIG. 3 presents an isometric view of the first door holder of the device for temporarily joining doors together illustrated in FIGS. 1 and 2 prior to being temporarily affixed to an upper edge of a first door.
Figure 4:
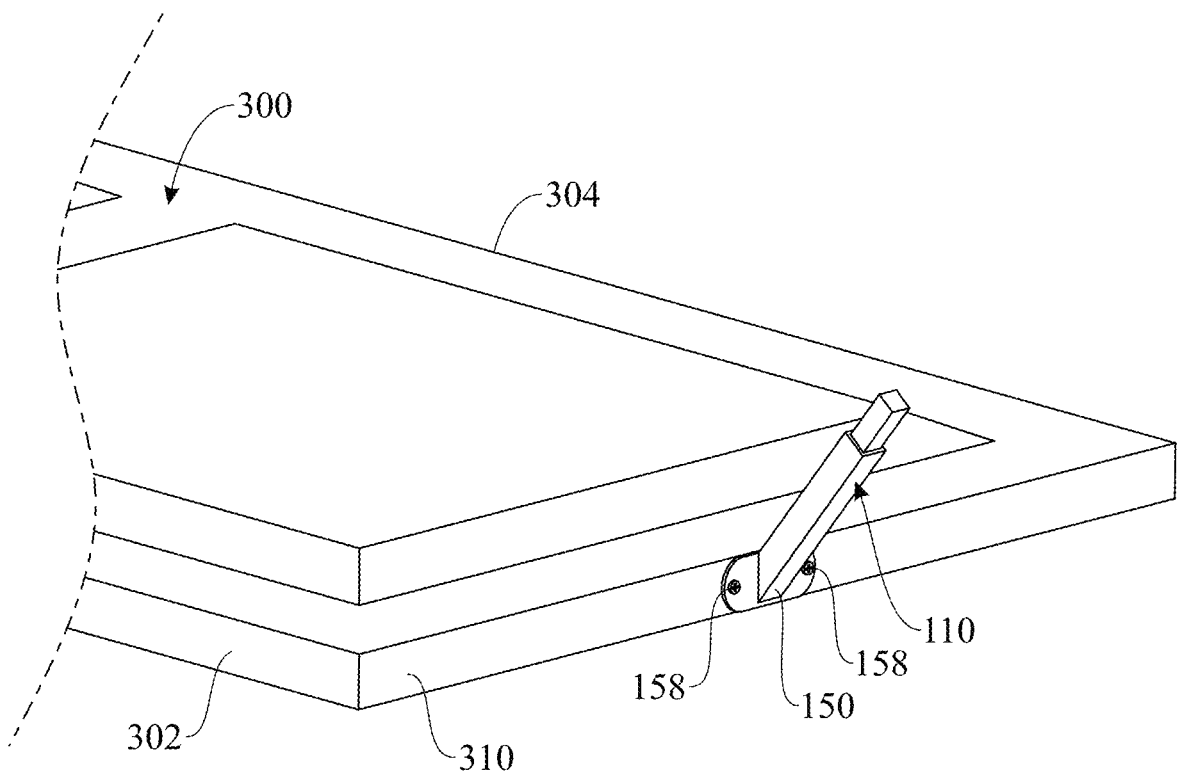
FIG. 4 presents an isometric view of the first door holder of the device for temporarily joining doors together illustrated in FIGS. 1 and 2 temporarily affixed to the upper edge of the first door.

Initially, and with reference to FIGS. 3 and 4, the first door holder 110 is positioned adjacent to an edge of a first door such as, for example, a first door 300, as shown in FIG. 3. The device for temporarily joining doors 100 may include a pair of first mounting screws 158, or the first mounting screws 158 may be obtained separately, for affixing the first door holder 110 to the first door 300. The first door 300 has a first side edge 302, a second side edge 304 and an upper edge 310. The first door holder 110 is positioned along the upper edge 310 of the first door 300 and removably affixed thereto.

More specifically, the first mounting plate 150 of the first door holder is positioned along the upper edge 310 of the first door 300 and the first mounting screws 158 are inserted through the first mounting apertures 154 in the first mounting plate 150, and the first mounting screws 158 are driven into the upper edge 310 of the first door 300 to removably affix the first door holder 110 of the device for temporarily joining doors 100 to the first door 300, as shown in FIG. 4.

While not specifically shown, the second door holder 112 of the device for temporarily joining doors 100 is similarly attached to an upper edge 330 of the second door 320. The second door holder 112 is removably affixed to the upper edge 330 of the second door 320 with additional mounting screws (not shown). Thus, the first door holder 100 and the second door holder 112 of the device for temporarily joining doors 100 are removably affixed to each of the first and second doors 300, 320, respectively, as shown in FIG. 5.

Figure 5:
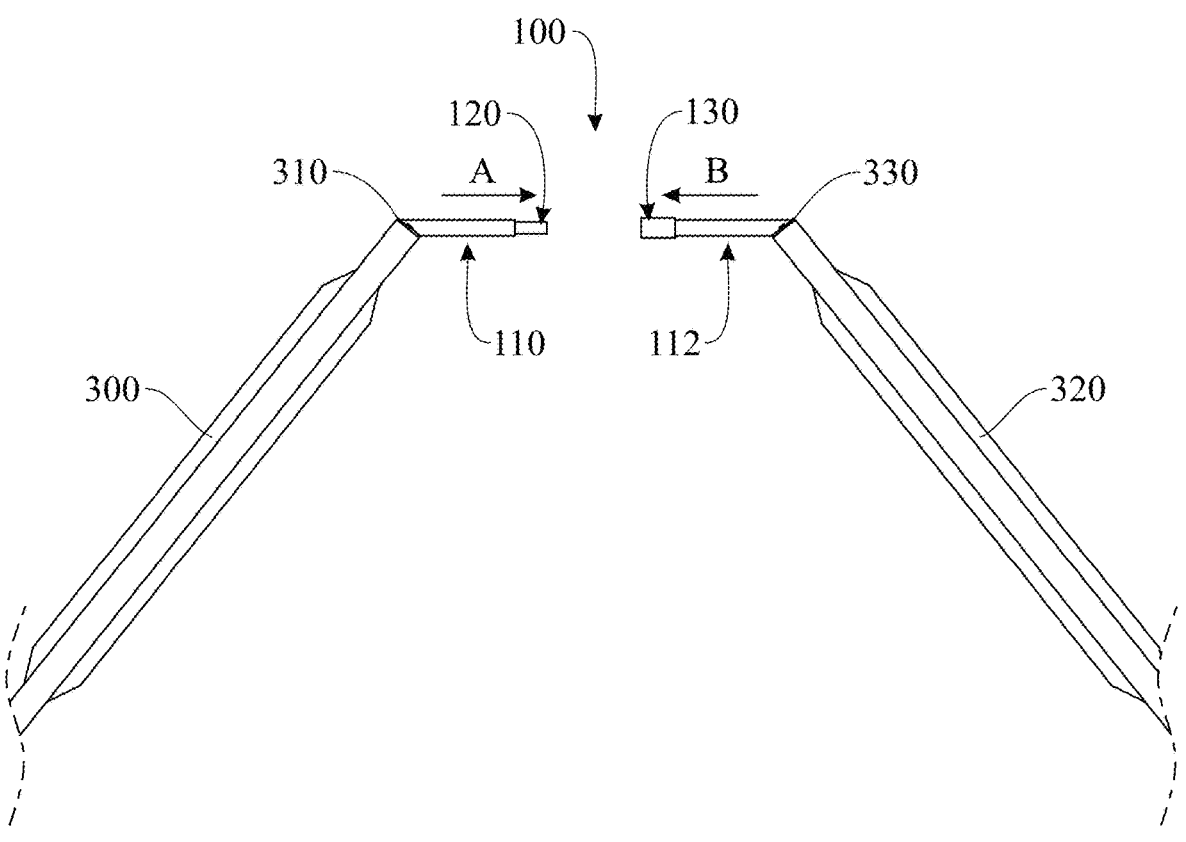
FIG. 5 presents a side plan view of the first door holder of the device for temporarily joining doors together illustrated in FIGS. 1 and 2 temporarily affixed to the upper edge of the first door and the second door holder of the device for temporarily joining doors together also illustrated in FIGS. 1 and 2 temporarily affixed to an upper edge of a second door.
Figure 6:
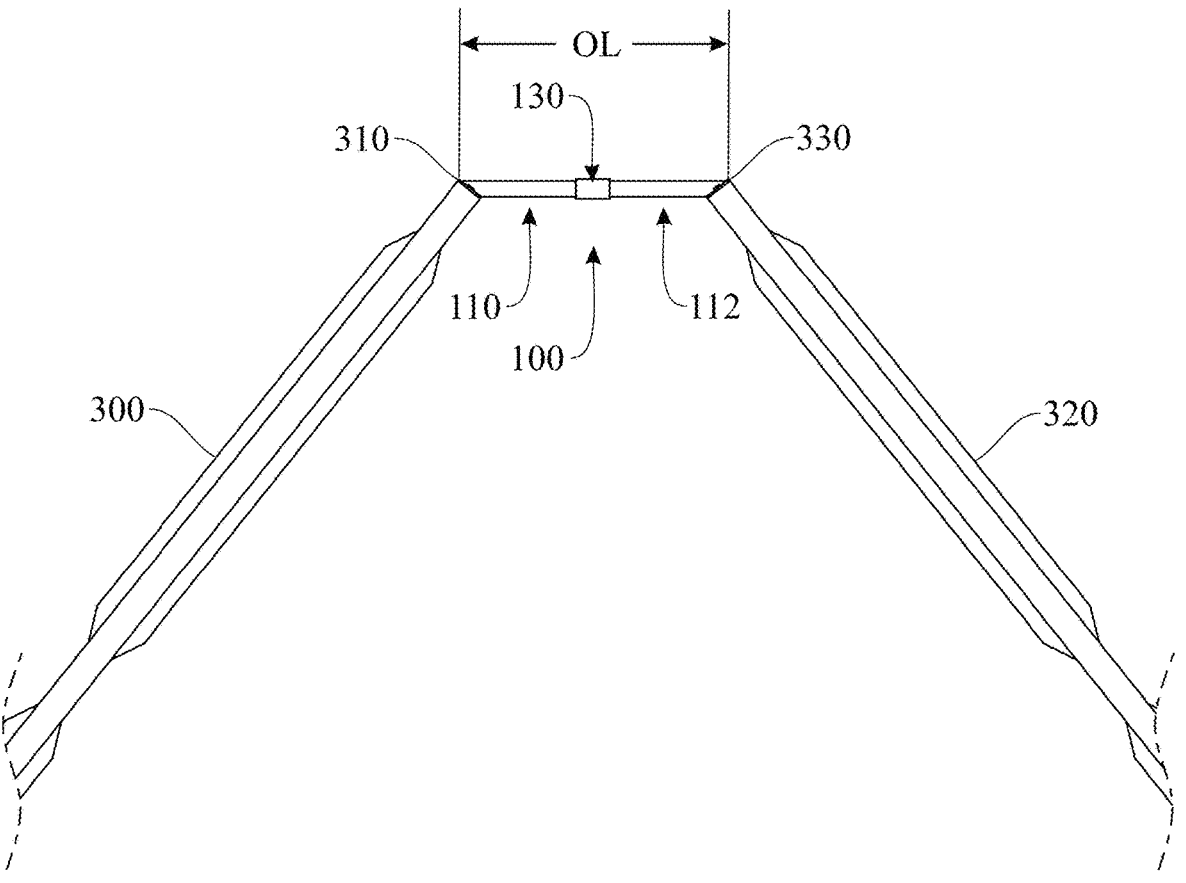
FIG. 6 presents a side plan view, similar to FIG. 5, with the first and second door holders of the device for temporarily joining doors together illustrated in FIGS. 1 and 2 connected together to support the first and second doors in position to be painted.

With reference to FIGS. 1, 5 and 6, once the first and second door holders 110, 112, respectively, of the device for temporarily joining doors 100, have been removably affixed to the first and second doors 300, 320, respectively, the first and second doors 300, 320 are positioned so as to align the first door holder 100 with the second door holder 112, as shown in FIG. 5. Thereafter, the combined first door holder 100 and first door 300 and the combined second door holder 112 and second door 320 are moved together in the direction of arrows A and/or B to bring the male connector 120 of the first door holder 110 into alignment with the female connector 130 of the second door holder 112. The male connector 120 is positioned in alignment with the channel 136 in the female connector 130 of the second door holder 112. The first and second door holders 110, 112, respectively, are move together until the male connector 120 is fully seated in the channel 136 in the second connector 130 such that the end face 126 of the first shaft 122 of the first door holder 110 abuts the end face 138 of the female connector 130 of the second door holder 112, thereby releasably engaging the first door holder 110 and the second door holder 112 with one another, as shown in FIG. 6. As noted above, a releasable connector (not shown) may be provided and inserted through aligned apertures (not shown) in the male and female connectors 120, 130, respectively, to retain the first door holder 110 and the second door holder 112 releasably engaged with one another. Thus, the device for temporarily joining doors 100 temporarily joins the first and second doors 300 and 320, respectively, together for ease of painting, once again, as shown in FIG. 6.

As further shown in FIG. 6, the joined first and second door holders 110 and 112 have a combined overall length OL. Thus, the device for temporarily joining doors 100 separates the upper edges 310, 330 of the first and second doors 300, 320, respectively, by the overall length OL to allow a painter to easily access and paint inner and outer surfaces of the first and second doors 300, 320. Additionally, the weight of the first and second doors 300, 320 are each directed inwardly towards each other to stabilize the overall assembly on a support surface.

Figure 7:
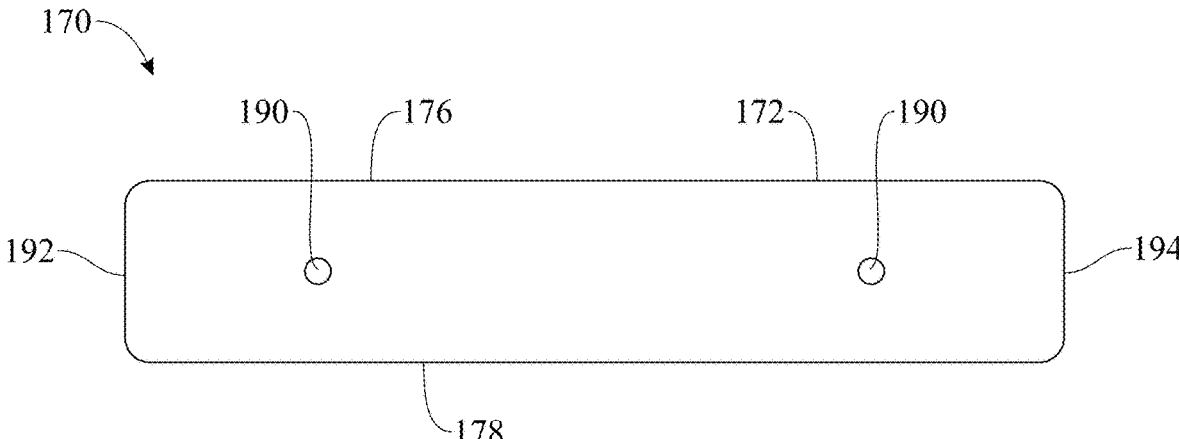
FIG. 7 presents a top plan view of a door support for use with the device for temporarily joining doors together.
Figure 8:
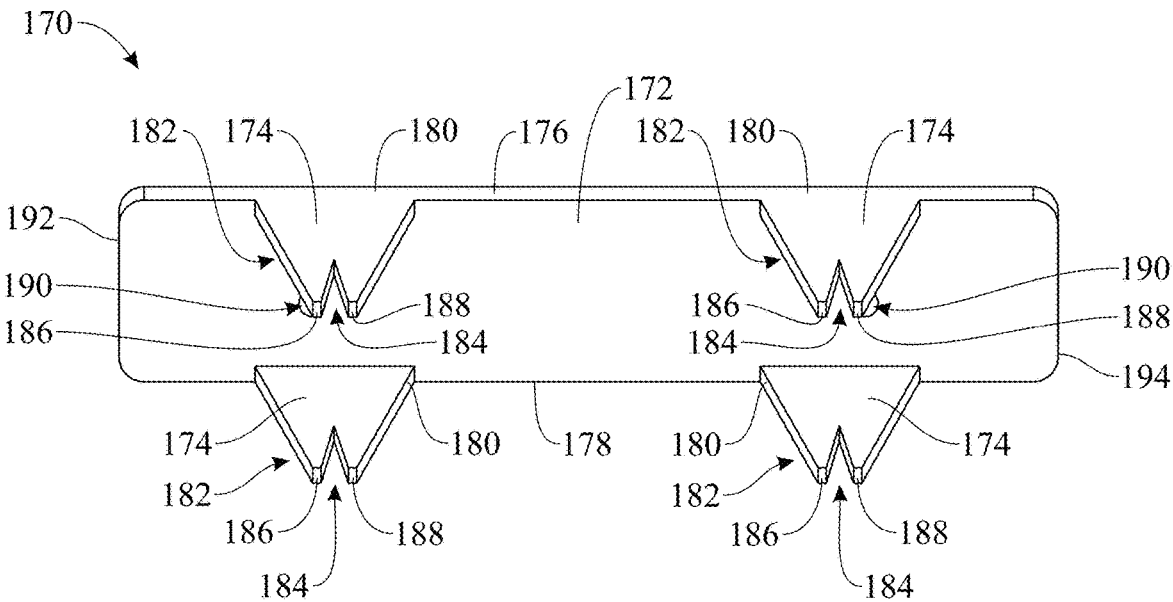
FIG. 8 presents a bottom, side isometric view of the door support of FIG. 7.

With reference next to FIGS. 7 and 8, the device for temporarily joining doors 100 may further include one or more door supports 170 to facilitate supporting the first and second doors 300, 320, respectively, in an upright position on a support surface. The door support 170 generally includes a base plate 174 and one or more support legs 174 extending from the base plate 172. The base plate 172 may have a first side edge 176 and a second side edge 178. As shown in FIG. 8, in one embodiment, four support legs 174 extend outwardly, i.e., perpendicularly, from the base plate 172 of the door support 170. More specifically, two support legs 174 extend from the first side edge 176 of the base plate 172 and two other support legs 174 extend from the second side edge 178 of the base plate 172. Each support leg 174 may have a generally triangular shape with a wide first end 180 extending from the base plate 172 and a narrow second end 182 extending outwardly therefrom and defining a notch 184. The notch 184 in the second end 182 of the support leg 174 forms a first point 186 and a second point 188. The first and second points 186, 188, respectively, aid the support leg 174 in gripping the ground or other support surface such that the door support 170 supports the door on the ground or other support surface. This prevents the bottoms of the doors from sliding out from under the angled position, as discussed below.

As shown in FIG. 7, the door support 170 also includes a pair of mounting apertures 190 formed through the base plate 172. In one embodiment, the mounting apertures 190 are positioned adjacent opposite first and second ends 192, 194, respectively, of the base plate 172. While the support legs 174 are disclosed as extending from the first and second side edges 176, 178, respectively, of the base plate 172 of the door support 170, it should be appreciated that the support legs 174 may extend from any combination of the first side, second side, first end and second end 176, 178, 192, 194, respectively, of the base plate 172 of the door support 170. In one embodiment, the mounting apertures 190 are positioned between opposed pairs of support legs 174.

Figure 9:
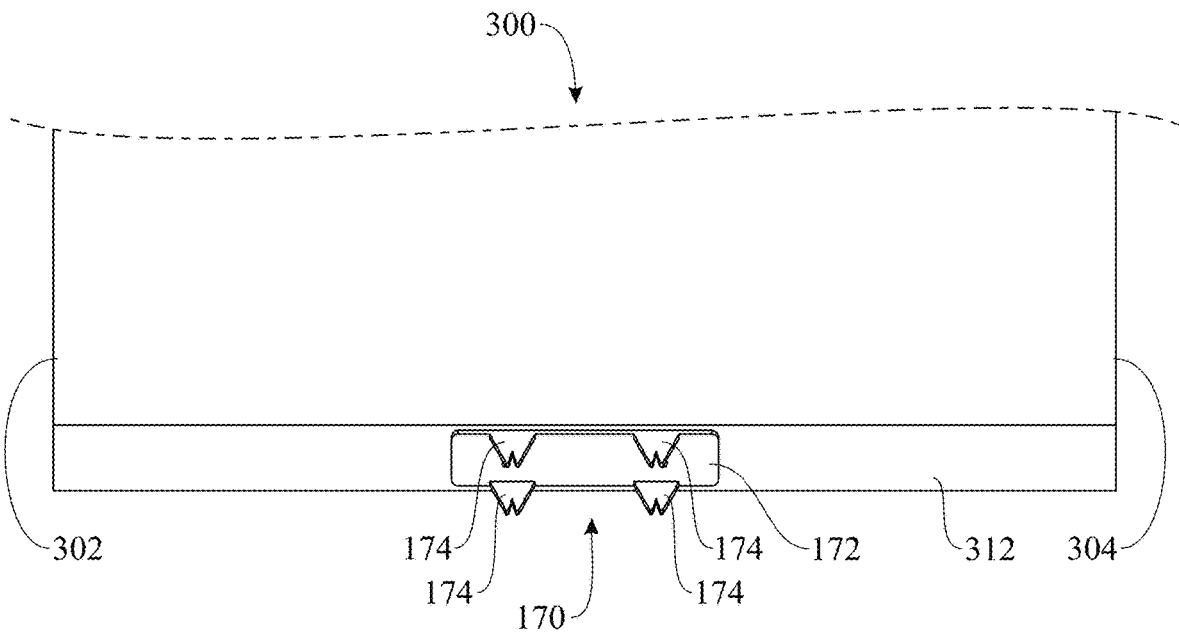
FIG. 9 presents a bottom, side isometric view of the door support of FIG. 8 temporarily affixed to a bottom edge of the first door.

The door supports 170 are removably attached to bottom edges of the first and second doors 300, 320, respectively. For example, as shown in FIG. 9, the door support 170 is attached to a bottom edge 312 of the first door 300, such as by inserting screws through the mounting apertures 190 and into the bottom edge 312 of the first door 300. While not specifically shown, the door supports 170 may alternatively be attached to the side edges of doors, for example the first and second side edges 302, 304, respectively, of the first door 300, if the user or painter wishes to lay the doors down on their sides for ease of painting while still maintaining the doors off of (e.g., above) the support surface.

The door support 170 can be formed from a variety of materials such as, for example, metallic materials, fiberglass or polymeric materials. Metallic materials may include, but are in no manner limited to, brass, bronze, steel, stainless steel, or aluminum. Polymeric materials may include, but again are in no manner limited to, plastics, such as polyvinyl chloride, thermoplastics, or hard rubber. In one embodiment, the door supports 170 are formed from steel. The support legs 174 of the door support 170 may be formed integrally with the base plate 172 of the door support 170 or may be formed separately and attached to the base plate 172 in various manners such as, by way of example only, welding, soldering, adhesives, or mechanical fasteners.

Figure 10:
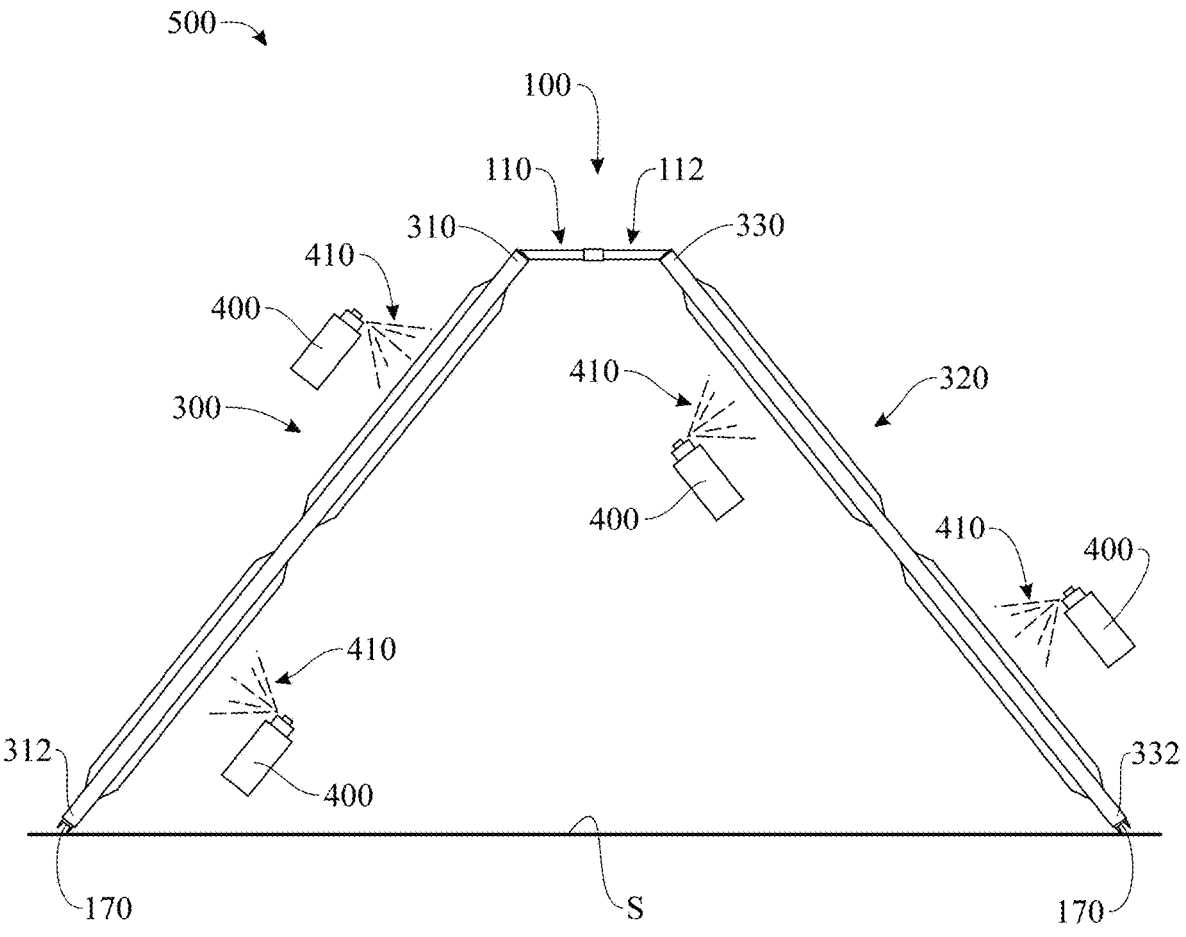
FIG. 10 presents a side plan view, similar to FIG. 6, of a system with the first and second door holders of the device for temporarily joining doors together illustrated in FIGS. 1 and 2 connected together and with door supports illustrated in FIGS. 7 and 8 temporarily affixed to the bottom edge of the first door and a bottom edge of the second door to support the first and second doors above the support surface in position to be painted.

Together, the device for temporarily joining doors 100 and the door supports 170 form a system 500 for stabilizing and securing a pair of doors in an upright position on a support surface S, as shown in FIG. 10.

As shown FIG. 10, while in use, the first and second doors 300, 320, respectively, are joined together at their respective upper edges 310, 330 by the device for temporarily joining doors 100 and are positioned on a support surface S, such as, by way of example, the ground, proximate respective bottom edges 312, 332 by the door supports 170. In this arrangement, the first and second doors 300, 320, respectively, are supported on the support surface S without the assistance or need for additional personal to support the first and second doors 300, 320, respectively, in position for painting. The user or painter can then use paint brushes or paint guns, for example paint guns 400, to spray paint 410 onto the surfaces of the first and second doors 300, 320, respectively.

Once painting has been completed and the paint has been allowed to dry, the device for temporarily joining doors 100 and the door supports 170 of the system 500 for stabilizing and securing a pair of doors in an upright position on a support surface can be removed from the first and second doors 300, 320, respectively, and the doors 300, 320 may be placed into service. More specifically, the device for temporarily joining doors 100 and the door supports 170 can be removed from the first and second doors 300, 320, respectively, by unscrewing the mounting screws, for example, the mounting screws 158. The first door holder 110 and the second door holder 112 may be separated from each other before or after removal from the first and second doors 300, 320. Thus, the device for temporarily joining doors 100 and the door supports 170 provided a novel system 500 for stabilizing and securing a pair of doors in an upright position on a support surface for painting without the need for additional personal to support the doors (e.g., first and second doors 300, 320, respectively) in position for painting.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A device for temporarily joining doors together to cooperatively support one another on a support surface, the device comprising:
   a first door holder having a first connector attached to a first shaft, wherein said first connector and said first shaft each comprise a generally open trapezoidal cross-sectional configuration, and a first mounting plate attached to said first shaft at a first angle to removably affix said first door holder to one of the doors;
   a second door holder having a second connector attached to a second shaft, wherein said second connector comprises a generally closed trapezoidal cross-sectional configuration at least partially defining a closed channel therein and said second shaft comprises a generally open trapezoidal cross-sectional configuration, and a second mounting plate attached to said second shaft at a second angle to removably affix said second door holder to a different one of the doors;
   said first connector comprising a male connector having a generally open trapezoidal cross-sectional configuration and said second connector comprising a female connector configured and dimensioned to releasably receive said first connector therein, and
   said first door holder releasably engageable with said second door holder to temporarily join the doors together, the doors cooperatively supporting one another on the support surface while said first door holder is removably affixed to the one of the doors and said second door bolder is removably affixed to the different one of the doors and the first door holder is releasably engaged with said second door holder.

2. The device as recited in claim 1, wherein the closed channel is configured and dimensioned to releasably receive said first connector therein.

3. The device as recited in claim 1, wherein said first angle is from about 30 degrees to about 60 degrees.

4. The device as recited in claim 3, wherein said second angle is from about 30 degrees to about 60 degrees.

5. The device as recited in claim 4, wherein said first angle is approximately equal to said second angle.

6. A system for temporarily joining doors together to cooperatively support one another on a support surface, the system comprising:
   a device for temporarily joining doors together, said device comprising:
   a first door holder having a first connector attached to a first shaft, wherein said first connector and said first shaft each comprise a generally open trapezoidal cross-sectional configuration, and a first mounting plate attached to said first shaft at a first angle to removably affix said first door holder to one of the doors;

a second door holder having a second connector attached to a second shaft, wherein said second connector comprises a generally closed trapezoidal cross-sectional configuration at least partially defining a closed channel therein and said second shaft comprises a generally open trapezoidal cross-sectional configuration, and a second mounting plate attached to said second shaft at a second angle to removable affix said second door holder to a different one of the doors;

said first connector comprising a male connector having a generally open trapezoidal cross-sectional configuration and said second connector comprising a female connector configured and dimensioned to releasably receive said first connector therein; and said first door holder releasably engageable with said second door holder to temporarily join the doors together, the doors cooperatively supporting one another on the support surface while said first door holder is removably affixed to the one of the doors and said second door holder is removably affixed to the different one of the doors and the first door holder is releasably engaged with said second door holder; and one or more door supports to facilitate supporting the doors in an upright position on the support surface.

* * * * *